July 14, 1925.
W. W. UNDERWOOD
TRACTOR ATTACHMENT
Filed Dec. 13, 1924
1,546,268
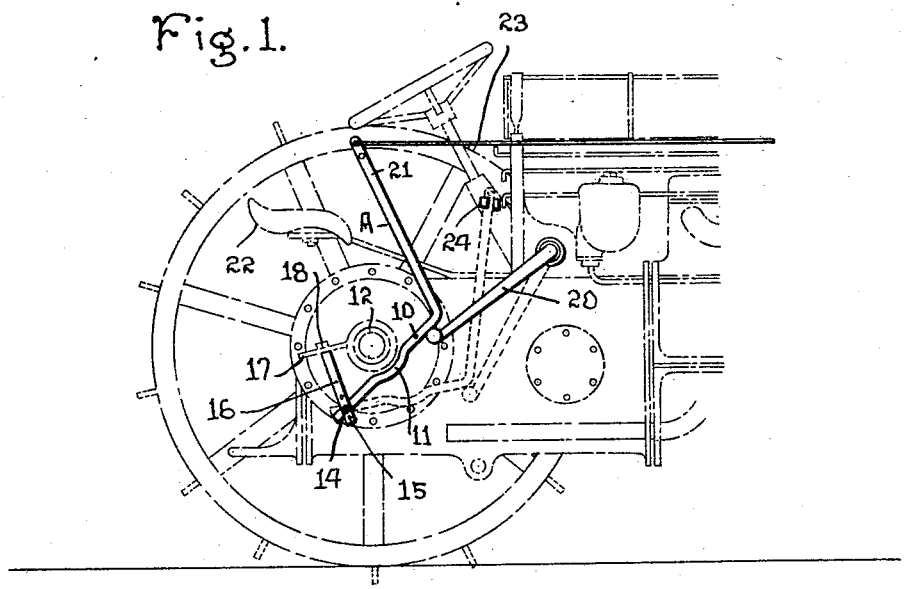
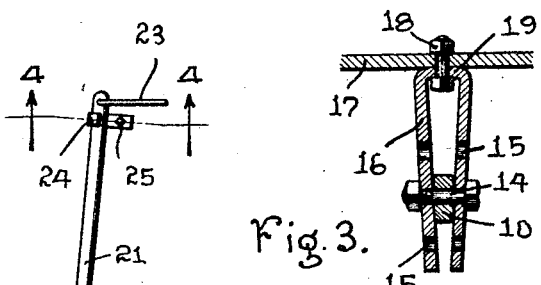
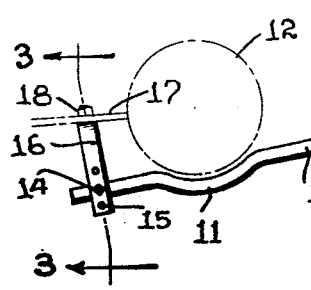
Inventor
W. W. UNDERWOOD.
By
Attorney Patented July 14, 1925.

1,546,268

UNITED STATES PATENT OFFICE.

WALTER W. UNDERWOOD, OF EVERTON, MISSOURI.

TRACTOR ATTACHMENT.

Application filed December 13, 1924. Serial No. 755,763.

*To all whom it may concern:*

Be it known that I, WALTER W. UNDERWOOD, a citizen of the United States of America, residing at Everton, in the county of Dade and State of Missouri, have invented new and useful Improvements in Tractor Attachments, of which the following is a specification.

The purpose of the invention is to provide a device for use in connection with tractors, whereby the clutch of the same may be controlled and locked in neutral from the driver's seat, so that in ascending a hill where conditions may arise causing a stoppage of the tractor motor, the clutch may be readily thrown into neutral and held in such position, thus disconnecting the motor and the driving wheels and at the same time leaving the transmission in gear, thereby avoiding the likelihood of the tractor descending the hill during the act of starting the motor; to provide an attachment susceptible of being operated at a remote point, as when the tractor is operating a wood saw or hay press or other machinery, thus making it possible for the attendant at the operated machine to control the tractor; and to provide a device capable of being cheaply produced and, therefore, simple in construction and readily attached to different forms of tractors in use.

With these purposes in view, the invention consists in a construction and combination of parts of which a preferred embodiment is illustrated in the accompanying drawings, wherein:

Figure 1 is a view in side elevation showing the invention attached.

Figure 2 is an enlarged side elevational view of the device.

Figure 3 is a vertical sectional view on the plane indicated by the line 3—3 of Figure 2.

Figure 4 is a horizontal sectional view on the plane indicated by the line 4—4 of Figure 2.

The invention consists of an angular member A of which the rearwardly extending leg 10 is offset at 11 to clear the axle housing 12 of the tractor, the rear end of the leg being provided with an eye pivotally engaged with a bolt 14 selectively insertible through holes or eyes 15 in the legs of a depending U-shaped member 16, the U-shaped member being secured to the fender bracket 17 by means of a bolt 18 normally operating to hold the fender in position, the bolt passing through an eye in the transverse portion 19 of the U-shaped member. The leg 10 is designed to bear upon the clutch lever 20 and when depressed, as shown in dotted lines in Figure 1, the clutch lever is moved to a neutral position indicated in dotted lines in said figure.

The upright leg 21 of the angular member functions as the operating means for the rearwardly extending leg 10, the upper end of the upright leg being within convenient reach of the occupant of the driver's seat 22, so that the operator, in pressing forward on the leg 21, may thereby depress the leg 10 and thus move the clutch lever 20 to neutral position. Remote control of the device is effected by means of a flexible connection 23 either in the form of a cord or wire led forwardly to a point in convenient reach of the operator of the machine or device being actuated by the tractor when the latter is used as a stationary power plant.

In order that the clutch lever may be secured in neutral position, a hook member 24 is provided, secured to the tractor by means of a bolt 25, this hook member being adapted for engagement by the upright leg 21 when the clutch lever is in neutral position, the hook member being positioned at a point where it will effect a lateral deflection of the leg 21 prior to engagement, so that when the leg 21, in being moved forwardly has passed the deflected nose or lip 26 of the hook member, it may spring back to its normal plane to engage in the hook. Release from the hook constitutes the forward movement of the leg 21 sufficient to disengage it from the former, followed by a lateral deflection of the leg sufficient to clear the hook, when the clutch lever spring is free to actuate and moves the clutch to engaged position, at the same time raising the rearwardly extending leg 10 upwardly and swinging the upright leg backwardly.

The invention having been described, what is claimed as new and useful is:

1. In combination with a tractor provided with a clutch lever, an angular member consisting of upright and rearwardly extending legs of which the latter is pivotally mounted at its rear end and adjacent its point of connection with the former bears upon the clutch lever, and a hook carried by the tractor and engageable with the upright leg when the rearwardly extending leg is depressed to shift the clutch lever to neutral position.

2. In combination with a tractor having a clutch lever and an operator's seat, an angular member consisting of connected upright and rearwardly extending legs, the latter being pivotally mounted at its rear end and bearing on the clutch lever adjacent its point of connection with the upright leg, said upright leg consisting of operating means for actuation by the occupant of the operator's seat to depress the rearwardly extending leg to dispose the clutch lever in neutral.

3. In combination with a tractor having a clutch lever and an operators's seat, an angular member consisting of connected upright and rearwardly extending legs, the latter being pivotally mounted at its rear end and bearing on the clutch lever adjacent its point of connection with the upright leg, said upright leg consisting of operating means for actuation by the occupant of the operator's seat to depress the rearwardly extending leg to dispose the clutch lever in neutral, and a hook carried by the tractor frame and engageable with the upright leg when the rearwardly extending leg is depressed and the clutch lever in neutral.

4. In combination with a tractor having a clutch lever, a depending U-shaped member secured to the tractor frame, an angular member consisting of connected rearwardly extending and upright legs of which the former at its rear end is disposed between the legs of the U-shaped member and pivotally connected therewith, the rearwardly extending leg bearing upon the clutch lever at its point of connection with the upright leg, a hook carried by the tractor frame and engageable with the upright leg adjacent its upper end when the rearwardly extending leg is depressed and the clutch lever in neutral, and a flexible connection with the upper extremity of the upright leg for the actuation of the angular member at a point remote from the tractor.

In testimony whereof he affixes his signature.

WALTER W. UNDERWOOD.